United States Patent [19]

Kerzner

[11] Patent Number: 4,942,528
[45] Date of Patent: * Jul. 17, 1990

[54] DIPMETER PROCESSING TECHNIQUE

[75] Inventor: Mark G. Kerzner, Houston, Tex.

[73] Assignee: Halliburton Logging Services Inc., Houston, Tex.

[*] Notice: The portion of the term of this patent subsequent to Aug. 1, 2006 has been disclaimed.

[21] Appl. No.: 238,089

[22] Filed: Aug. 30, 1988

Related U.S. Application Data

[63] Continuation-in-part of Ser. No. 63,608, Jun. 18, 1987, Pat. No. 4,853,855.

[51] Int. Cl.⁵ .............................................. G01V 1/28
[52] U.S. Cl. .................................... 364/422; 73/151
[58] Field of Search ................. 364/422; 73/151, 152; 324/333

[56] References Cited

U.S. PATENT DOCUMENTS 4,541,275  9/1985  Kerzner ............................ 73/152

Primary Examiner—Jerry Smith
Assistant Examiner—Steven G. Kibby
Attorney, Agent, or Firm—William J. Beard

[57] ABSTRACT

A process for processing a dipmeter curve is shown in the preferred embodiment. In a curve, line segments are drawn between curve minima, a second set of line segments are drawn between minima in the first segments, and this is repeated to desired number of levels. When finished, line segments are numbered and become a branched tree. This tree is reorganized to form an event tree which is easily coverted into a stored digital value and is processed for correlation with other curves. The events are reduced in number by using area and length criteria. Correlation is limited to a selected range of shift centered on either zero dip or dip from nearby formation information.

13 Claims, 5 Drawing Sheets

DIPMETER PROCESSING TECHNIQUE

BACKGROUND OF THE DISCLOSURE

This disclosure is a continuation-in-part of application Ser. No. 07/063,608 filed Jun. 18, 1987 now U.S. Pat. No. 4,853,855.

In general terms, the optimum approach for interpreting well log data obtained by dipmeter is visual inspection and correlation by a skilled and experienced operator. The dipmeter analyst utilizes an optical device to shift and contrast two or more curves obtained from a dipmeter. Attempts to accomplish this by something other than human observation have been made in the past. Another approach is correlation of dipmeter logs by fixed interval correlation methods. The various and sundry mechanized correlation methods impose on the data the requirements for data free of noise, or what otherwise is termed as high quality data. The quality of data sometimes will vary in a fashion that poor quality cannot be overcome. For instance, the quality of data is dependent on downhole conditions which vary with a multiple of factors. The conditions impact the quality of curves presented for dipmeter interpretation. When such difficulties arise, as a practical matter, the only approach then left is optical correlation. Again, optical correlation may be the most accurate and desirable approach but it is also a good deal more expensive and tedious in that it requires an experienced human operator.

The present approach is able to provide interpretation in the stead of fixed interval correlation techniques. In general terms, the approach of the present disclosure utilizes what are called segmentation trees with hierarchial multilevel optimization. These terms will be defined in greater sweep below.

The process set forth in the related application implements a successful approach to dipmeter processing. The segmentation tree as described therein leading into a correlation system can provide successful analysis. However, it requires storage of relatively large quantities of data and as a result, normally requires a longer time to test various combinations for correlations. On the one hand, it is desirable to look at all potential correlations; on the other hand, only certain or selected correlations are useful. This balancing conflict has heretofore been resolved by making a large number of correlations with a view of finding the optimum correlation and yet generates successive data and requires extended computing time for completion.

The present disclosure provides an advance over the procedures set forth in the related disclosure. In particular, this process, at the initial segmentation steps, locates meaningful events for correlation and accomplishes the correlation with a reduction in data processing and does this with a related reduction in stored data. Rather than test for every possible correlation between two curves, the number of potential possibilities is reduced and only those having some minimal level of correlation are considered.

One of the helpful steps to reducing the amount of data in the extensive correlation otherwise required is a first step of reducing the number of events (data) in the segmentation step. As disclosed heretofore, segmentation of a curve requires breaking the curve into a number of points on a tree. The improved procedure contemplated in this disclosure recognizes that not every dipmeter event is important. Certain of the events are simply too small to be significant. Accordingly, one of the useful criteria to be applied to events reduces the total number of data entries in the segmentation step. As described, limitations relating to the vertical extent and area under the curve are both useful. Measured along the curve, it is preferable that an event be subdivided so that the dipmeter signal does not represent an event longer in vertical extent than about 180 cm, and not smaller in vertical extent than about 7.5 cm. An area measurement is additionally considered. The range of events (7.5 cm to 180 cm) is arbitrarily divided into subgroups, namely, 180 cm to 120 cm, another group at 120 cm to 30 cm, 30 cm to 7.5 cm, and events outside the three respective ranges listed above are thus ignored. The event vertical extent and area under the curve define related criteria which reduce the number of data which must be converted into segmentation tree entries. Events can be grouped as to size, referring to the vertical extent of such events grouped above, and that can be used as a qualifier in creating the segmentation tree prior to correlation. This is particularly useful in defining a degree of analysis in advance, even permitting detailed stratigraphic correlation.

One of the other advantages of the present procedure is a controlled basis in shifting two logs adjacent to one another. The initial position involves correlation of two logs which are not shifted. In other words, a correlation is attempted without shifting. Shifting thereafter occurs incrementally, moving the curves by fixed increments up and then down. In terms of hand analysis, this would correspond to sliding one of the two curves left and then right as the two curves are laid on the light table so that the log analyst can search for matching regions in the two curves accomplishing visual correlation. The present procedure accomplishes the foregoing by holding one of the curves stationary, alternately moving the other curve incrementally by fixed distances in both directions and testing for correlation between the shifted curves. This is much more efficient in terms of machine time required for computing the correlation. Often, correlation programs merely assign the range of movement such as a search length parameter and accomplish the test through the whole of the test length. This procedure thus implements the presumption that horizontal is the norm, thereafter moving above and below that by growing increments. This will ultimately find the optimum correlation between the two curves.

If other data suggests a particular or expected displacement between the two curves, the present routine implements that so that this displacement is suggested and the curve is thereafter incrementally moved to the left and right by increments and is incrementally further shifted to obtain a set of correlation coefficients for that initial offset condition. In all the foregoing correlation procedures, sets of correlation coefficients are obtained, and they are plotted or charted. They are obtained for a displacement interval, broken into equal steps, and out of that group, a desirable correlation coefficient can be selected. Alternatively, an arbitrary coefficient value can be assigned, and any which exceeds it is acceptable.

One advantage of this approach is that the correlation coefficient is computed only until an acceptable correlation is accepted. This reduces computer time. Moreover, it does not fall into the trap of running the program for the maximum curve displacement; rather, the routine may cut short because the acceptable correlation coefficient is found. This therefore limits the typical search. The present routine is enhanced by providing additional criteria.

Correlation coefficients for four curves have been developed which determine the sequence of correlation testing. As an example, if four curves are available and one has a significantly smaller number of events than the others, it is not used as the base curve from which correlation is made, and is considered only after correlation for the other curves. The first expected correlation is planar horizons. One possibility involves use of a four curve correlation combination wherein no correlation is found; if one of the four curves appears to be more difficult to correlate it is deleted momentarily and curve displacement which yields planarity is then tested for the remaining three curves; failing that, the three curves which yield correlation with displacement are determined and then the fourth curve is correlated with the other three. That correlation step involves the use of the displacement determined by the other three curves. Another alternate method of reducing data processing tests for definite correlation involving three of the four curves, discards the fourth and determines a definite correlation from the three. In that instance, the fourth curve can be ignored. If it is difficult to obtain a three pad correlation out of four curves, the process then seeks correlation between pairs of curves. As will be understood, these correlation procedures reduce the computing time required to process the data.

The use of the generally described concepts implemented in the present apparatus and procedure enhance showings of dip angle and direction. Because there is a hierarchy of data, dynamic programming techniques are more readily applied.

DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PRESENT DISCLOSURE

A dipmeter is a device which utilizes a measurement pad having a sensor thereon. Typically, four pads are arranged around the dipmeter located at 90° spacing. They make measurements of resistivity. The resistivity measurements are taken along a borehole. When a formation is encountered, it is observed at one of the pads before it is observed at the other pads assuming that the formation has dip. This is ordinarily the fact. The extent of dip can be determined by interpretation of the dipmeter data obtained from the multiple sensors. The preferred arrangement of four sensors provides four data traces for a typical borehole. They are analyzed by hand in one approach, the four data being plotted as curves on a common strip chart. The strip chart normally records the data as a function of depth so that one axis of the paper is depth in the well borehole. Optical analysis involves locating a common event in one curve and then in another curve. This is optically assisted by utilizing instruments which superimpose one curve over the other and which also permit lateral movement so that they can be shifted.

A fixed interval correlation has been described by Kemp in the 1980 paper entitled "An Algorithm for Automatic Dip Computation" *Computers and Geosciences,* Volume 6, Page 193-209. Various and sundry fixed interval correlation techniques are discussed in other references, Schoonover, Larry G., and Holt, O. R.; "Computer Methods of Dip Log Correlation", *Paper SPE* 3566 presented at the 1973 SPE Technical Conference and Exhibition and Moran, J. H., Coufleau, M. A., Miller, G. K. and Timmons, J. P., "Automatic Computation of Dipmeter Logs Digitally Recorded on Magnetic Tapes", *J. Pet. Tech.* (1961), Vol. 14, No. 7, 771-82. In the various correlation strategies, event selection from a given profile curve is somewhat arbitrary and in many instances the event selection criteria differs from that which would prevail with an optical correlation utilizing an experienced analyst. Clearly, optical correlation is the better because it is not confined by arbitrary limitations such as specific lengths of curve, limiting analysis to predefined peaks, troughs or plateaus, etc.

When one looks at this problem in a broader light, it can be stated in general terms as breaking a curve into meaningful pieces. It has been found that the major impediment to analysis is that the curve can be organized into events of different relative sizes, and these sizes are set in advance. Accordingly, various schemes based on multiple scales had to be repeated for each selected scale. This approach, however, creates computational burdens.

The scheme of curve analysis suggested below is data driven, rather than parameter-driven. This approach allows it to find simultaneously all meaningful events of all sizes. It is based on a simple geometrical procedure and on a number of rules extracted from the process of optical dipmeter correlation.

Figure 1:
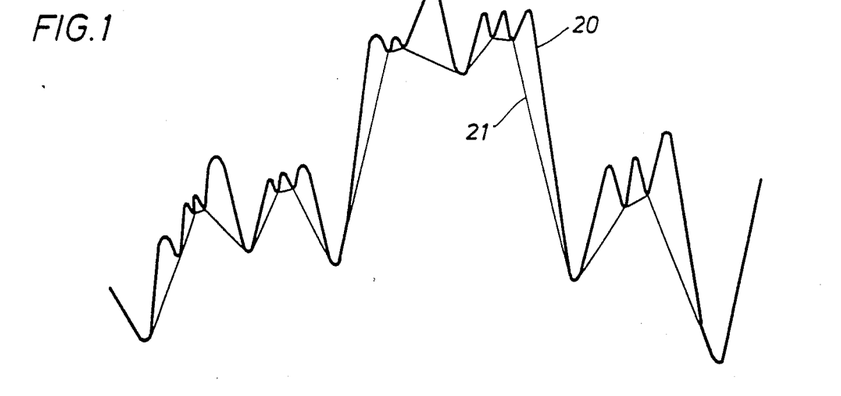
FIG. 1 is a profile curve from a sensor on a dipmeter where local minima are connected by segments of straight lines to initiate segmentation.
Figure 2:
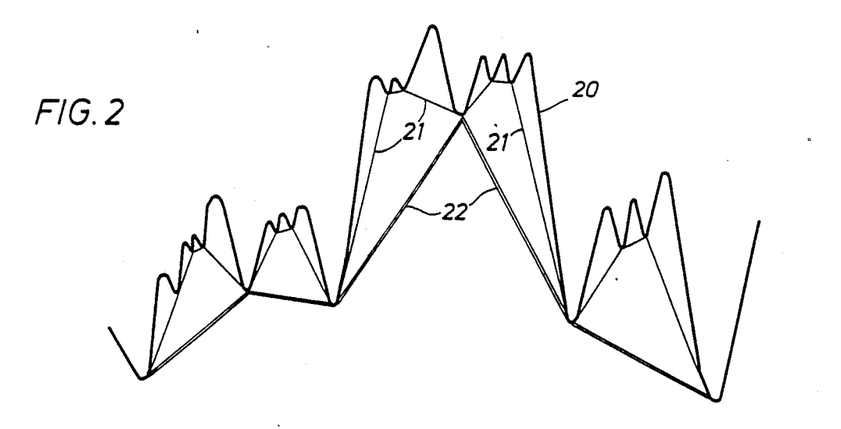
FIG. 2 shows the same curve of FIG. 1 with a double line connection to minima of the segments of FIG. 1.

Consider a curve 20, such as the one on FIG. 1, with all its local minima marked and connected by segments 21 of straight line. This connecting contour can be regarded as a first approximation to the initial curve. Similarly, one can find the local minima of the connecting line and connect them with the second-order connecting line 22, as in FIG. 2. The connecting line in FIG. 2, drawn as a double line, can be regarded as a second-order approximation to the initial curve. This process can be continued with third-order line 23, fourth-order line 24 and so on, until no two minima can be found on the last approximating line, as in FIG. 3.

Figure 3:
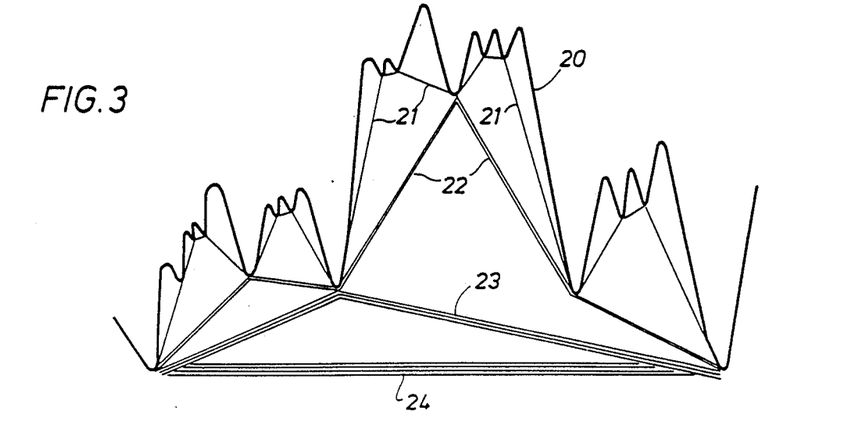
FIG. 3 shows further curve segmentation utilizing minima in the double line segments.
Figure 4:
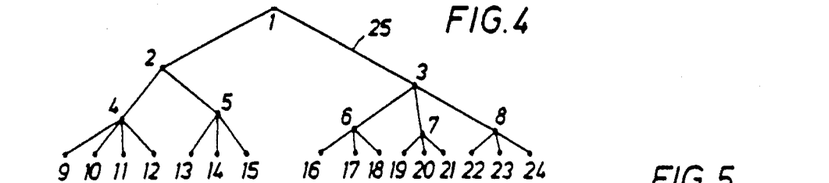
FIG. 4 shows a tree structure representing the segments in the curve shown in FIG. 3.

Notice that most apparently meaningful events are present in the resulting segmentation on FIG. 3 and are delineated by a single, double, or triple lines. After all line segments in FIG. 3 are numbered, their relationship can be represented by a tree diagram 25, such as the one shown in FIG. 4.

The segmentation described above and its associated tree structure are called a segmentation tree. It is important to realize that the initial curve is not substituted by approximation lines, rather, the lines serve only as a means of segmenting the curve, or breaking it into pieces; this explains the term segmentation tree.

As would seem clear, not every curve segment in a segmentation tree is important and can be used for correlation. A selection criterion can be formulated using the following simple consideration. Consider FIG. 5, where curves 26, 27 and 28 represent variations of one basic shape. The curve 26 is almost always considered as one whole event, curve 27 is almost always separated into two constituent events, while curve 28 is a transition case.

Figure 5:
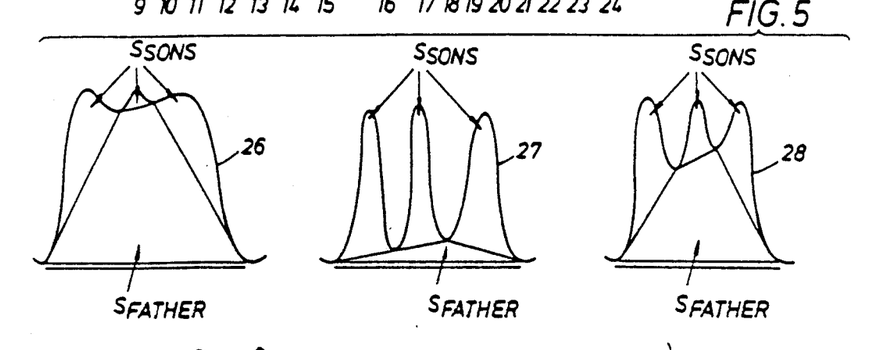
FIG. 5 shows an approach for breaking events into subevents for ease of correlation involving relative contrasting areas.

To distinguish between these cases in the algorithm, an area criterion is used. Let $S_{sons}$ denote the total area of the sons, and $S_{father}$ the area of the father, as shown in FIG. 5. $S_{sons}$ is determined as the sum of the areas under all son segments. In the curve 26, $S_{sons}$ is less than $S_{father}$; in the curve 27, $S_{sons}$ is greater than $S_{father}$; and in the curve 28 the areas are comparable.

Following the discussion above, the area comparison criterion for the selection of meaningful events can be formulated as follows: any event, for which $S_{father}$ is greater than $S_{sons}$ is correlated as a whole; any event for which $S_{father}$ is less than or equal to $S_{sons}$ will not be correlated as a whole, although its sons may be considered for correlation. It should also be noted that when an event is correlated as a whole, its sons may also be used for correlation.

Segmentation of a curve using segmentation trees and the area comparison criterion described above allows the algorithm to select the same events that would be considered as good candidates for correlation in optical processing. These ideas are general, however, in the sense that they provide the basis for event detection and will give satisfactory results in most, but not all cases. A number of additional rules, derived from the observation of optical processing, are used to improve the event detection. These rules are described below. Before proceeding with them, however, some consideration will be offered for the explanation and justification of the event detection scheme suggested above.

DISCUSSION OF THE EVENT DETECTION ALGORITHM

As one can notice, the basic curve elements used for correlation and for constructing more complex events are pieces of a profile curve from one local minimum to another, where the direction of curvature is upwards.

First, upward curvature is a preferred direction in optical correlation. Second, it corresponds to determining dip from resistive beds of those whose resistivity is higher than the resistivity of the surrounding beds.

When the dipmeter is operated in saline, conductive muds, the resistivity is measured more precisely in resistive beds. In addition, the measurement taken against resistive beds is less impacted by the conductivity of the mud. Both considerations above lead to greater curve repeatability in resistive beds, making them more preferable for dip determination.

For some special cases of logging, however, this situation is reversed, and correlation should be done primarily on conductive beds. Since the dip results depend to some extent upon the selection of resistive or conductive beds for correlation, the option for their selection has been implemented in the program. It is called the oil-based option, and it is primarily used for dipmeter logs recorded in oil-based muds, although it can be applied to any log. Technically it means event selection based on local curve maxima, rather than minima, and it is implemented by inverting the base curve values and searching it again for local minima.

It must also be noted that there is a certain quality of a resistivity measurement which makes the suggested scheme particularly effective. It has been noticed that, as a sensor goes out of a resistive bed, the measurement usually exhibits a small overshoot. Due to this a resistive bed becomes delineated by two local minima on the upper and lower side, thus providing the minima needed for curve segmentation.

ADDITIONAL STEPS FOR EVENT DETECTION

There are a number of additional steps, which make the event detection scheme, based on segmentation trees and area comparison, more precise and adapt it particularly to the task of dipmeter correlation. Some of these are technical in nature while some are practical, and have been formulated by analyzing the process of optical correlation. Following are certain technical rules.

TREE STRUCTURE

Figures 6, 7:
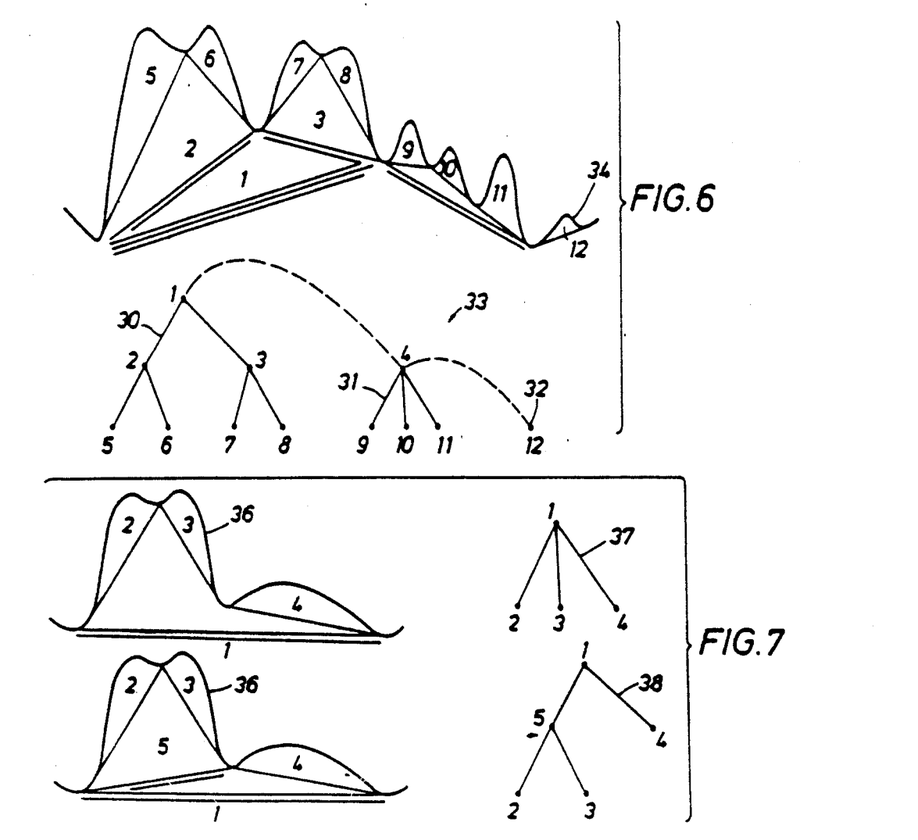
FIG. 6 shows a profile curve and a segmentation tree arrangement wherein adjacent subtrees are united in a common segmentation tree.
FIG. 7 shows a simplified regrouping of subevents in a segmentation tree to provide additional events for analysis.

The tree describing the relationships between events on the curve is not a single tree with one root, but rather a collection of trees because, at the end of the curve interval, some events of the lower level do not group to form an event of a higher level. An exemplary structure is illustrated in FIG. 6. This figure also shows how the subtrees 30, 31 and 32 are joined into one connected tree from the curve 34.

TREE GROUPING

Some events that appear as a unity (in optical analysis) do not come out as a unity in the segmentation tree; instead, they are either broken up or are united with other events. This situation is illustrated in FIG. 7. The curve 36 develops the tree 37 at the right. From this example, an operation called grouping is introduced. This operation checks all possible combinations of events belonging to one father and tests them using the area comparison criterion described above. Any group that passes the test is marked as an event, and this event is added to the segmentation tree 38, as illustrated in FIG. 7.

TREE MARKING

This step refers to marking those events in the segmentation tree that are considered as good candidates for correlation. It is accomplished using the area comparison criterion described above. All events of level 2 (see FIG. 2) and higher are tested against this criterion and are marked for correlation if they pass the test. All events of level 1 are marked for correlation unless they are marked down by any other rule that prohibits using them. Examples of such rules are given below. Depending upon the curve character, the number of events marked for correlation constitutes from 50% to 10% of the total number of events in the segmentation tree.

TREE REDUCTION

Since not all events are selected for correlation, the initial tree structure is changed after the tree is marked. When all unnecessary events are deleted, and all new connections between them are recorded, the new, reduced tree contains only events that make good candidates for correlation. The initial segmentation structure is, therefore, called a segmentation tree, and the final structure, with many unnecessary events eliminated is called an event tree Using the event tree instead of the segmentation tree is also helpful for saving computer time and memory.

The steps described above for making the segmentation tree complete, for grouping, for marking, and for reducing the tree, together with a few less significant steps given below, serve to adjust the initial segmentation algorithm and to make event selection closer to the one done in optical analysis. These rules relate to the internal work of the algorithm.

There are also, as has already been mentioned, practical steps, taken directly from observation of optical correlation. Examples of these rules are listed below.

EVENT SIZE

The width of an event considered for correlation should be no less than 7.5 cm and no more than 180 cm. The lower limit is introduced because, with diminishing size of events, the possibility of miscorrelation increases. The upper limit comes from experience in log analyzing and knowledge of the area logged. It is also explained by the goal of looking for precise, and not averaged, dip; thick beds usually consist of several sub-beds, each with its own dip. When using beds that are too thick, one may lose information.

Event size is determined by the vertical extent of the event. Events are preferably grouped into ranges of size with area discussed below. Representative ranges for groupings of events all refer to vertical extent along the dipmeter signal. A representative set of sizes and interrelationships utilizes the following standards: an event can not be larger in vertical extent than 1.8 meters. If larger, it is subdivided so that the maximum vertical extent does not exceed this measure. Such events are grouped into smaller events including the range of 1.2 up to 1.8 meters. The next category is 0.3 meters to 1.2 meters. The next smaller group extends from 30 cm down to 7.5 cm. Events smaller than that are not individually analyzed. In addition to vertical extent criteria exemplified above, area criteria can also be added. One example of this is to incorporate an area criteria for events between 30 cm. and 7.5 cm. to the effect that the area of the $S_{father}$ is greater than one half the area of $S_{sons}$ in which case smaller area events in this range should be ignored. In the range between 1.2 meters and 1.8 meters, if the area of the $S_{father}$ is equal to or greater than two times the area $S_{sons}$, such bigger events can be separately evaluated for breaking down into multiple events.

ALLOWING NO FURTHER DIVISION OF AN EVENT

When an event is small and consists of a number of even smaller events, insignificant when compared to the main event, it should not be subdivided further, and its constituent events should not be correlated. This rule prevents the algorithm from correlating insignificant curve variations. It is expressed using the language of segmentation trees, by a number of subrules, for example: if the event level is 2, its own area $S_{father}$ is 2 times greater than the area of its sons $S_{sons}$, and its width is less than 30 cm, then the event is not further subdivided.

EVENT CORRELATION

Event correlation is the next step of the algorithm. In this stage events marked on one curve, which is from now on called a base curve, are correlated to the other curves. The correlation is implemented in a hierarchical multilevel optimization process; this allows the algorithm to take into account as many interdependencies between events and corresponding correlations as can be identified. Event correlation can be broken into four steps.

STEP #1

The first step is to determine all correlation choices for each event. This is done by computing a correlogram (a plot of correlation coefficients, measuring curve similarity, versus all possible displacements) and by selecting displacements corresponding to all local maxima of this correlogram, where the value of the correlation coefficient exceeds a certain threshold. These possible displacements from curve pairs 1-2, 1-3, and 1-4 are then combined, and for all combinations planarity is checked. The value of planarity cutoff is determined by known statistical and area geological considerations. All found correlations between all four pads are then recorded.

It may be noted here that all correlations found for an event refer to this event. It is therefore logical to store this information as part of this event's record. All event records in the event tree, when copied from a segmentation tree, are supplied for storing correlations. Typical computer protocol involves use of a scratch pad memory.

STEP #2

The second step in event correlation is called family optimization. To explain this step, consider an event in the event tree which contains subevents, called sons. Obviously, any correlation choice of the son event should agree with the correlation choice of the father. The agreement can be formulated as a requirement that the correlation of the sons should not conflict with the correlation of the father. Even then, for each correlation choice of the father there may be a few possible correlation choices for the sons, all agreeing with that of the father.

Dynamic programming of this kind and its particular application solutions are treated in detail by Kerzner, "Image Processing in Well Log Analysis", IHRDC, Boston (1986), where the algorithms for their solution are also given.

When the solutions are found, correlation coefficients of selected son correlations are added to the correlation coefficient of the father correlation, thereby increasing its importance. This step imitates giving more importance to those matches that repeat in detail, and not only in general shape.

The proportionality coefficient solved influences the scatter of resulting correlations. When the value of the coefficient is increased, the scatter is increased; when the value is diminished, the correlation progression becomes more gradual. However, the correlation progression can not be made much more gradual or more scattered than the data actually indicate.

The results computed in Step 2 are recorded in the scratch pad of each event obtained prepared in Step 1.

STEP #3

Step 3 in the correlation process is called optimization of correlations for senior events. In this step, the correlations for all senior events in the event tree are found. Senior events are defined as all events that do not have a father. Some of these events are indeed large events with a number of descendants, while some are merely low level events at the end of the depth interval; the majority of senior events, however, do have families, and their families have been optimized in the previous step, Step 2.

Since the families were optimized in Step 2, conditional correlations have been computed; for each correlation choice of a senior event, the algorithm has decided which combination of correlation choices of sons is in the best agreement with the correlation of the senior event, and the coefficients of importance have been modified accordingly. Using this information, it is now possible to find the best correlations for all senior events. The model used for family optimization is also used here. This model, again, allows selection of the best set of correlations by considering all combinations of them and by finding the most consistent. Solution to this model is described above.

STEP #4

This step involves decoding correlations for all remaining events. Once the correlations for senior events are determined in Step 3, they induce correlation selection at all lower levels, since conditional correlations have already been determined in Step 2. Step 4 thus finishes the determination of displacements. The dip angle and directions are computed using the known formulas of analytical geometry.

One note should be added here. As it can be seen from the description of the algorithm, the dips are determined for events of all sizes and all levels of enclosure (levels in the event tree) simultaneously. In fact, the information from all levels is used to help the algorithm decide the correct correlation selection. Geologically, this can be regarded as a simultaneous computing of structural and stratigraphic dip information at all possible levels. Graphically all this information can be presented in one plot, as described below.

DESCRIPTION OF ALGORITHM

Figure 8:
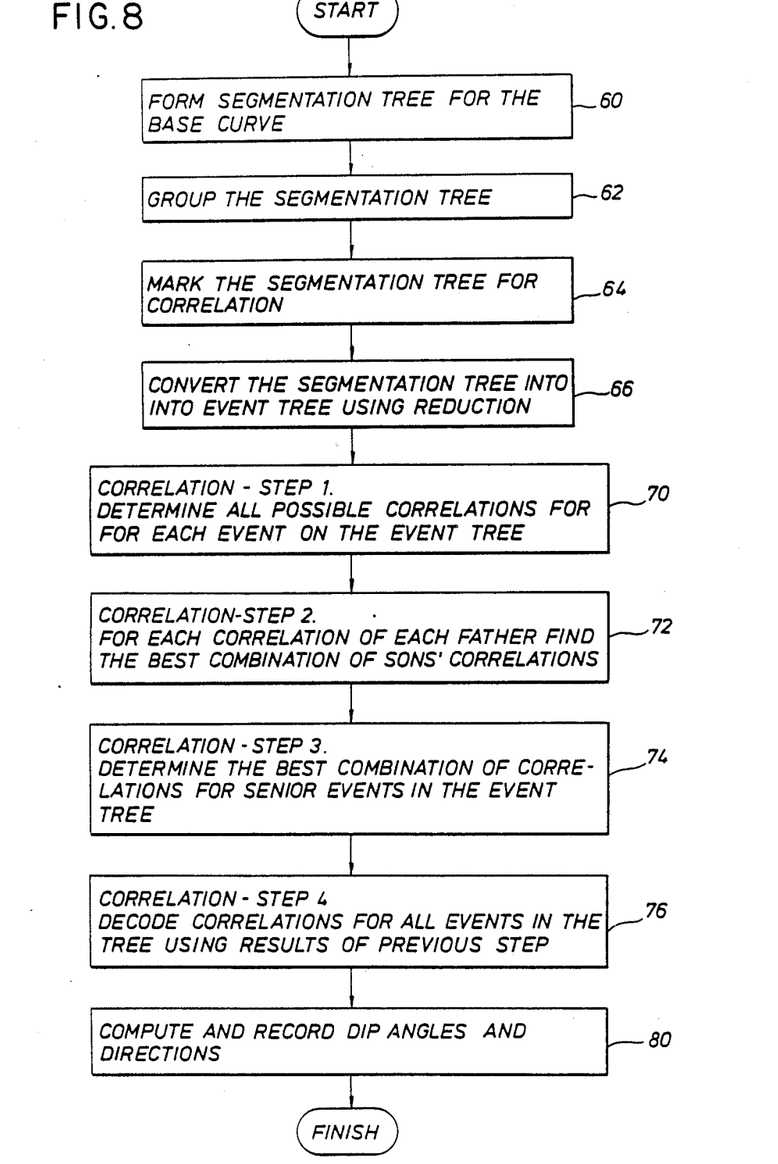
FIG. 8 is a flow chart of a procedure for segmentation and correlation.

In general terms, all of the foregoing is accomplished by an algorithm having the flow chart illustrated in FIG. 8. Beginning with the initial input of data, the algorithm is divided into two portions, the first being directed to breaking the respective curve up into segments. The first several steps relate to the segmentation tree while the last several steps relate to correlation.

The step 60 converts the curve into a segmentation tree as exemplified hereinabove at FIG. 1 and following. The curve is thus defined by a number of segments at multiple levels, three levels being exemplified in this example. The various curve minima are thus found and connected with a first line and then minima in that first line are located and connected with a double line, etc. until the several levels of minima are defined.

The next step is identified at 62 and this involves defining certain groups in the segmentation tree. This regrouping is exemplified at FIG. 5. This is accomplished by considering adjacent or connecting groups including father and son groupings. This is also accomplished by performing area comparisons as exemplified at FIG. 7.

The third step 64 in this sequence is to mark events that are possible candidates for correlation. To do so implies that certain events will be discarded. Marking generally is done by comparing areas. Typically, the area of the node is measured along with the area of all its sons. This summation is a preliminary. If the area of the node by itself is greater than the area of its sons, the event is considered as a whole. Possibly it will be reevaluated later when specific sons are evaluated.

The next step 66 in the algorithm is to reduce or eliminate nodes of the segmentation tree that are not needed for correlation. After this pass, the segmentation tree is then called an event tree. An example of such reduction is shown in FIG. 7 of the drawings. This then prepares the data representing the event tree for correlation described in the sequence of four steps 70, 72, 74 and 76 and these steps are illustrated in FIG. 17. After correlation has occurred, the actual dip is computed in step 80 and the data is then presented on a suitable graphic basis.

The results of the implementation of the new dipmeter correlation techniques prove the validity of an approach based on event detection and correlation. The formal techniques for implementing these steps are based on the use of segmentation trees and on hierarchial multilevel optimization. The multilevel event structure used in the algorithm corresponds to multilevel stratification taking place during deposition. The use of this correspondence allows the correlation algorithm to produce structural and stratigraphic dip information in one pass and to present it in one plot, supported with a display of events and correlations.

Figure 9:
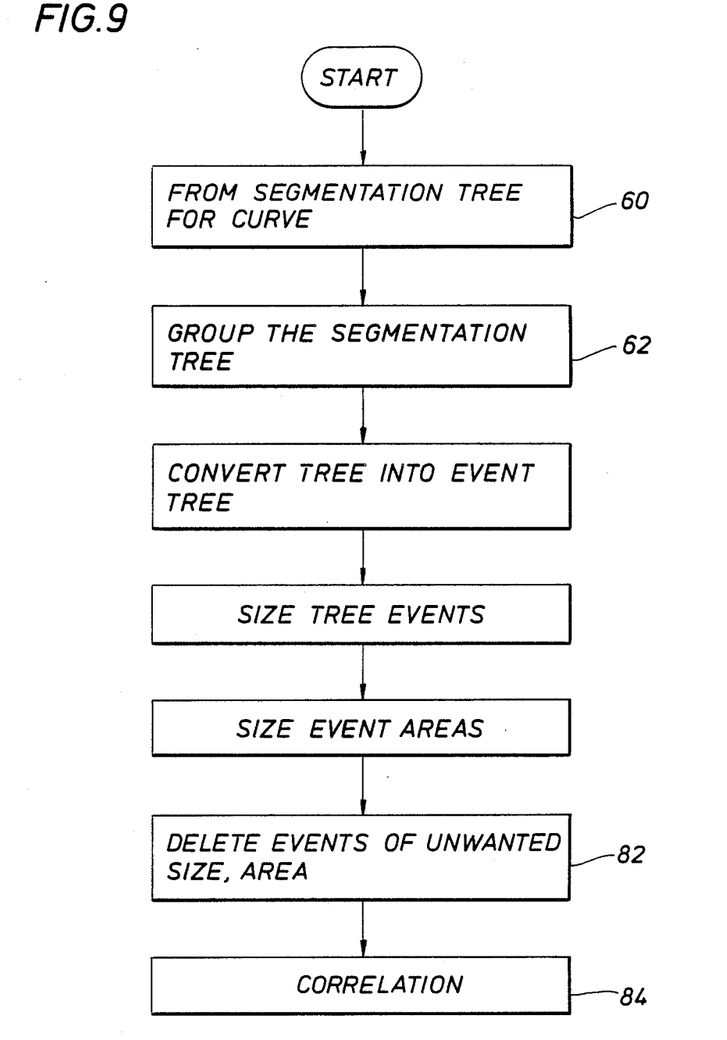
FIG. 9 is a flow chart for reduced segmentation of a curve.

Attention is now directed to FIG. 9 of the drawings which shows an alternate flow chart similar to the flow chart shown in FIG. 8 for curve segmentation. As above, it includes the initial step 60 which is to form the segmentation tree for the curve. The next step is to accomplish the segmentation tree grouping. This step 62 is similar to the sequence described above with regard to FIG. 8. The next step is to convert the segmentation tree into an event tree. This step records data for the various events that make up the curve. At this juncture, all events are acceptable. Now, procedures are implemented to reduce the number of events. The step involves the procedural step of grouping the events by the vertical length of the event. Several groupings were given above where the curve is broken into ranges of 7.5 cm to 180 cm. The size limitations are preferably stated in three to six size ranges, and the particular events in each of the several ranges are tagged with an indication of size. For instance, the range of 7.5 cm to 30 cm can be identified as Size 1 while the next size is Size 2. In subsequent data handling, the segmentation tree can be simplified by omitting certain of the events because they fall into rejected size categories such as Size 1.

The next step involves identification of the area of the respective events. This was earlier discussed and illustrated in conjunction with FIG. 5, this view showing three typical situations. Relative area criteria are established, and another suffix for the particular events is added to indicate area classification. This is handled as a suffix which is added behind the first suffix. In other words, this provides a second suffix for the various data describing the event tree.

The next step is is the deletion of events which have an unwanted size or area combination. This can be selected in advance. If stratigraphic analysis is required, small events are typically kept. However, if it is not important, small size events can be eliminated based on the vertical extent and area, both factors which created the encoded two suffixes added to the data. Thus, this step deletes those events which are unwanted because they are not acceptable as to vertical extent or area of the event. After that, the program proceeds to the correlation steps. They are represented in the lower portions of FIG. 8 as an example.

Figure 10:
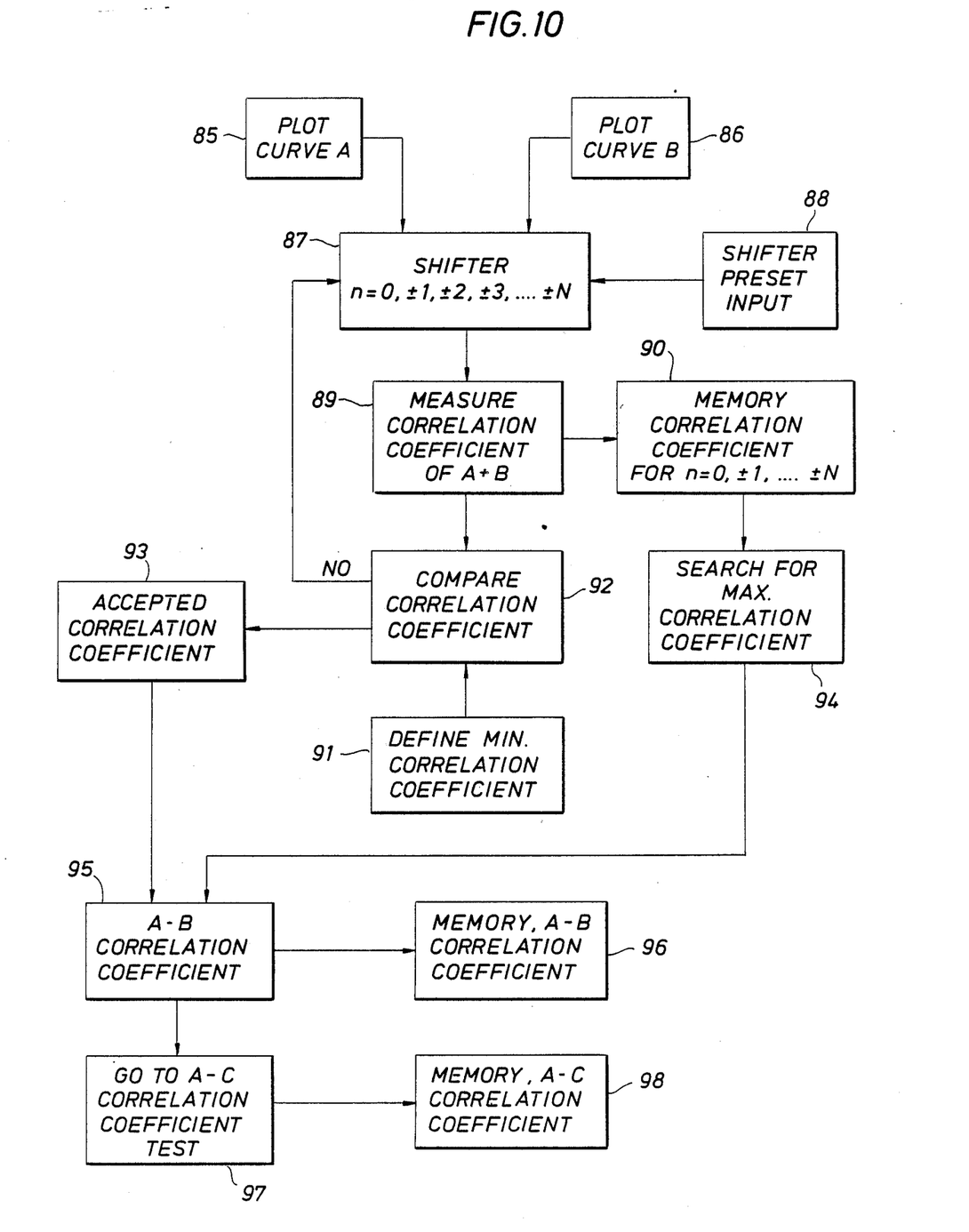
FIG. 10 is a flow chart for implementation of an algorithm of the present disclosure in which vertical shift obtains optimum correlation between curves.

Attention is now directed to FIG. 10 of the drawings which shows a modified correlation sequence. The following steps are included. The numerals 85 and 86 indicate the steps of obtaining the plots of two dipmeter curves which are identified as A and B. The curves A and B are input to a shifter 87. The shifter 87 is provided with a shifter preset input at 88. This step involves selection of a value for N. N is an integer which can be zero, and is varied by increments of fixed measure. The shifted relative to one another. When N is zero, the two curves are not shifted at all. If this is the case, a correlation between the two curves would indicate that the dip is substantially zero. In any event, the shifter 87 processes the value N incrementally through a range of values up to ±N where N increases to a maximum shift.

The next step at 89 involves determination of the correlation coefficient between the curves A and B. It is calculated for a particular value of N and then is output to a memory which stores the correlation coefficient at 90. If desired, a specified minimum value of correlation coefficient can be input at 91. If this is done, this provides an indication in the procedure which defines an acceptable correlation coefficient. A comparison step of the measured correlation coefficient between the curves A and B is indicated at 92. This step 92 determines a comparison and it provides an output indication of an acceptable correlation coefficient at 93. If an unacceptable value is determined the correlation coefficient is calculated for further shifts of the curves A and B. This continues until the maximum shift occurs for N increments. Shifting occurs in both positive and negative directions as indicated by the plus and minus signs on the value N. This results in continuing calculation of correlation coefficient which is input to the memory 90. After data have been accumulated for all values of ±N, the next step is to conduct a search for the maximum correlation coefficient from the several data. This is indicated at 94. Once that step has been completed, it forms an output. The alternate output is from the step 93. The steps 93 and 94 thus provide inputs of the AB correlation coefficient at 95. This is the determined correlation coefficient. That is then output to a memory representing the AB correlation coefficient in the memory at 96. The next step 97 is then to make a comparison between the curves A and C. That sequence can utilize the foregoing routine for the curves A and C rather than A and B. It also is completed and the correlation coefficient for the curves A and C is then output at the step 98.

While the foregoing is directed to the preferred embodiment, the scope thereof is determined by the claims which follow.

What is claimed is:

1. A method of correlating a pair of dipmeter curves comprising the steps of:
    (a) defining a segmentation tree for one of a pair of dipmeter curves;
    (b) converting the segmentation tree into an event tree by deleting curve events falling outside an event criteria based on event width and area;
    (c) determining correlation coefficients between pairs of curves using said event tree;
    (d) optimizing the correlation coefficients between said pairs of curves to obtain optimum curve correlation; and
    (e) determining formation dip from the optimally correlated curves.

2. The method of claim 1 wherein the step of defining a segmentation tree includes the steps of locating minima in the curve, drawing straight line segments between such minima to define a first level of segmentation, defining minima in the straight line segments and drawing straight lines therebetween to define a second level of segmentation and extending the segmentation to a designated number of levels.

3. The method of claim 2 wherein the selected minima define a segmentation tree representing the curve, and the tree is expressed in digital data form enabling digital storage.

4. The method of claim 1 including the step of obtaining a dipmeter curve with respect to conductivity and inverting the curve prior to defining a segmentation tree therefrom.

5. The method of claim 1 including the step of defining an event on the curve, detecting in that particular event subevents, measuring the area of the event after segmentation, measuring the area of the subevents after segmentation, and comparing the summed areas of the subevents with the area of the event to determine the necessity of further subevent segmentation.

6. The method of claim 1 wherein the step of defining a segmentation tree includes connecting dipmeter curve minima.

7. The method of claim 6 including the step of joining into a single segmentation tree adjacent subtrees along the curve.

8. The method of claim 6 including the step of limiting the smallest level of the segmentation tree to those corresponding with a minimum formation thickness.

9. The method of claim 6 further including regrouping adjacent events along the curve and reassigning such events to different portions of the segmentation tree.

10. The method of claim 1 wherein four curves are obtained from the use of a dipmeter in a well borehole, and each of the four curves is converted into a segmentation tree, and further wherein dip is determined for different pairs of the four curves.

11. A method of preparing dipmeter curve data for correlation comprising the steps of:
    (a) defining a segmentation tree for one of a pair of dipmeter curves;
    (b) converting the segmentation tree into an event tree by deleting curve events falling outside an event criteria;

(c) determining correlation coefficients between the pair of curves using said event trees, wherein the step of determining is performed over a limited range of curve shifting in which the range is centered at zero shift or a selected shift based on known dip in the area; and (d) optimizing the correlation coefficient between the curves to obtain correlation.

12. The method of claim 11 wherein the segmentation tree is made for dipmeter curves along a common well borehole as a function of depth and including the step of performing geometric analysis of correlated events to determine formation dip.

13. The method of claim 11 including the step of shifting a pair of curves with a beginning shift and incrementing the shift by $\pm N$ steps from the beginning shift to obtain correlation coefficients for a limited range.

* * * * *